Feb. 6, 1951    W. G. BROSENE, JR., ET AL    2,540,650
ANIMAL HOLDER
Filed March 22, 1947
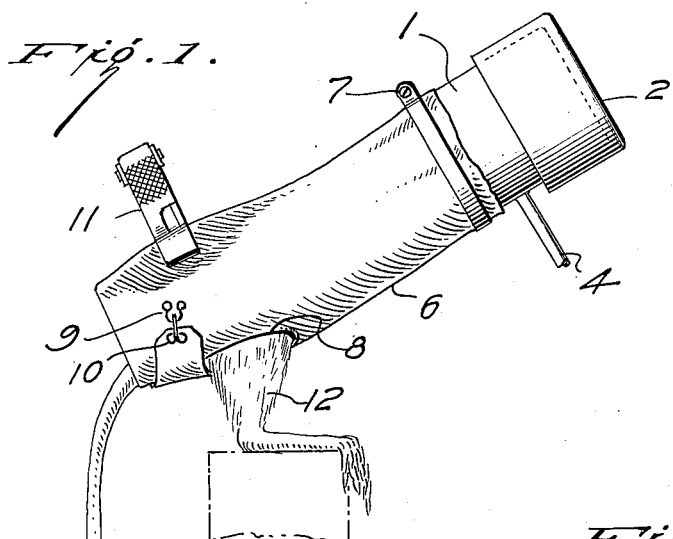
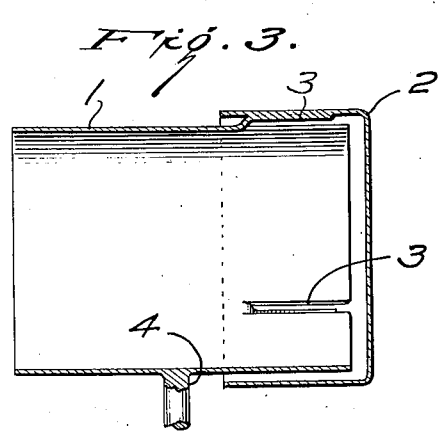
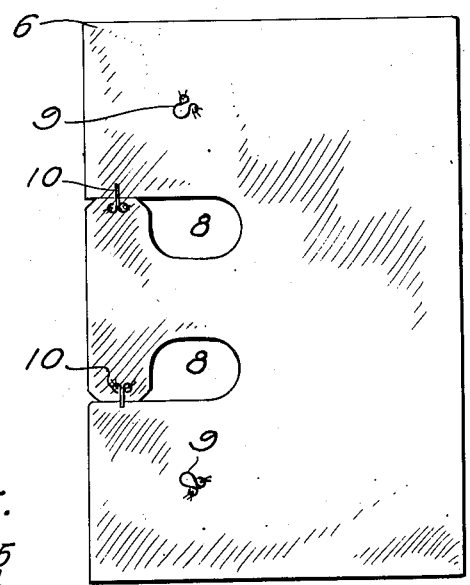
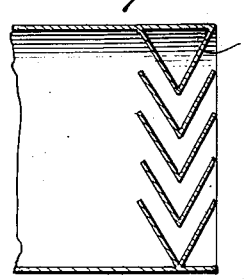
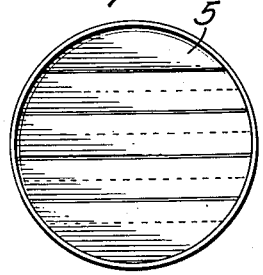
INVENTORS
WILLIAM G. BROSENE, JR.,
BY FRANK B. ABLONDI,
Samuel Branch Walker
ATTORNEY Patented Feb. 6, 1951

2,540,650

UNITED STATES PATENT OFFICE 2,540,650

ANIMAL HOLDER

William G. Brosene, Jr., Cincinnati, Ohio, and Frank B. Ablondi, Pearl River, N. Y., assignors to American Cyanamid Company, New York, N. Y., a corporation of Maine Application March 22, 1947, Serial No. 736,552

7 Claims. (Cl. 119—98)

This invention relates to a new type of animal restraining device which will hold an animal in a controlled environment and in restraint. It is particularly useful for holding rats, mice, dogs, cats, guinea pigs, hamsters and other laboratory animals while such animals are being used for various types of controlled laboratory experiments. The size and shape of the animals determine the exact size and proportions to be used for that animal. The device may be used in conjunction with a blood pressure measuring device as described and claimed in an application of Brosene and Kersten, Serial No. 711,714, filed November 22, 1946.

A specific object of our invention is to provide a convenient device which will hold a particular animal in such a position that the animal will be comparatively comfortable and contented so that the animal will remain quiet and undisturbed by environmental factors while being used for laboratory experimental work. While being used in conjunction with a blood pressure measuring device, the device has the particular advantage that the animal is well restrained and emotionally unexcited so that it is possible to measure the blood pressure of the animal in a relaxed condition and accordingly get the natural or rest blood pressure. The device may also be used for holding the animal in position while it is subjected to innoculations, or other experimental procedures. It is also possible to use the device as an animal holder while administering anaesthesia, preparatory to various laboratory procedures. A great many devices and experimental procedures have been worked out and used in the past to restrain animals under various circumstances but most of these devices have been such that the animal has been unduly excited by the procedures used and the net result is that the work is done on an animal in a highly excited, nervous state and, as is well known, the emotional response, blood pressure characteristics, respiration and pulse rate will not be normal under such circumstances. Our holder overcomes these disadvantages.

Our invention comprises a rigid essentially cylindrical holder with a support thereon having at one end a cap or other light baffling device which will permit the comparatively free circulation of air while cutting off a large proportion of the incident light. At the other end is a flexible body holder which wraps around the lower portion of the animal's body and is equipped with clips and so fitted as to restrain and hold the lower portion of the animal with selected portions of the animal extending through orifices in the body holder. If desired the device may be equipped with heating or cooling coils, water sprays, air blast, lights, noise makers, or other environmental determining devices which will affect the animal in a desired fashion so as to permit the determining of the response of the animal to such conditions.

The more specific objects and advantages will become apparent from the description following, taken with the accompanying descriptions and drawings of their embodiment.

In the drawings:

Fig. 1 is a side elevation of the animal holding device showing a rat in position.

Fig. 2 is a plan view of the outside portion of the flexible body holder.

Fig. 3 is a sectional view of the rigid portion of the holder showing a light barrier.

Fig. 4 is a sectional view showing a different light barrier arrangement.

Fig. 5 is an end view showing the barrier arrangement of Fig. 4.

In detail a substantially rigid tubular portion I which may be made of aluminum, brass, tin plate or other substantially corrosion-resistant metal or from rigid plastic or fiber board, has thereon a cap 2 which fits over the end of the tube so as to act as a light shield, but permit free air circulation. The interior portion of the cap and the end portion of the tube may be blackened so as to lower light reflections but ordinarily this precaution is not necessary. The cap may be removable so as to permit access to the front of the animal, although, for the smaller laboratory animals, it is usually preferable to solder or otherwise fasten the front portion to the tube. Off-set clips 3 cut from the body of the tube may be used as off-set spacers.

The tube is equipped with a rod 4 which may be used as a handle for the device and which is conveniently used as a support to clamp the device to a laboratory table in any desired location.

An alternate construction for the light barrier cap is shown in Figures 4 and 5. In this modification, angular barriers 5 are so positioned as to substantially shield and cut off light from the interior of the tube but still allow ventilation of the animal. Complete darkness is not necessary, but the animal tends to remain quieter if it is unable to see outside motion, and if the illumination level is low.

Around the lower portion of the tube is wrapped a flexible body holder 6 which may be made of leather, fabrikoid, cloth, fur, fleece or other material. It is desirable that this material be comparatively resistant to soiling. Leather is particularly satisfactory as it may be readily sponged off and maintained in a sanitary condition.

The flexible body holder is fastened to the tube with a clamp 7 but a spring retainer, wire or string or other retainer may be used. The lower portion of the body holder has openings 8 therein spaced so as to permit the legs of the experimental animal to protrude therefrom. The flap between the orifices is equipped with fasteners 10 which couple with the fastener shown at the side of the holder (as shown at 9) so as to permit this T-shaped flap to be placed between the animal's legs in the fashion of a diaper so as to snugly hold this portion of the animal.

The upper rear portion of the body holder may be held in position by clips 11 or other fasteners preferably so as to restrain the upper rear portion of the animal. The size of the various portions is experimentally determined so as to reasonably closely fit the particular animal for which the holder is to be used. The holder, when used for rats, should fit fairly snugly. When the rat is thus placed in a restraining environment which is dark, warm, and comfortable, the rat relaxes and quits struggling and apparently assumes a quiescent state thus permitting delicate experiments to be made upon the animal without the struggles of the rat interfering with the observations. It has been found that the rat when thus restrained will remain sufficiently quiet so that blood pressure measurements may be made on the exposed portions without the struggles of the rat upsetting the reliability of the measurement.

To the expert, slight modifications in size and design will suggest themselves so as to permit the device to be used upon a large variey of sizes of animals and for various measurements of desired variables. Such changes and modifications fall within the spirit and scope of this invention, as set forth in the accompanying claims.

As our invention we claim:

1. An animal restraining device comprising a tube, adapted to hold at least the major portion of the head of the animal, a ventilated cover therefor, and a flexible body holder fastened about one end, said holder having a T-shaped portion adapted to be held between the legs of the held animal.

2. An animal holder comprising a substantially rigid cylindrical portion adapted to hold at least the major portion of the head of the animal, a supporting rod integral with said cylindrical portion and outstanding therefrom whereby the entire animal holder may be readily supported, a flexible body holder having a T-shaped tongue integral therewith, adapted to be fastened between the legs of the held animal, to additional portions of said holder to firmly yet comfortably position an animal.

3. An animal restraining device comprising a tube having on one end thereof a ventilated cap adapted to hold at least the major portion of the head of the animal and permitting air but not a substantial amount of light to enter, a supporting means fastened to said tube, and a flexible body holder fastened about one end of said tube adapted to imprison firmly yet resiliently a portion of said animal whereby selected portions of said animal may be exposed for experimental purposes.

4. An animal support comprising a substantially rigid tubular head-containing portion, light-baffling ventilating means at one end thereof, and a flexible body restraining portion attached to the other end of said tube, so shaped that selected portions of the animal may be exposed.

5. An animal restraining device comprising a tube, adapted to hold at least the head of the restrained animal, a light baffling ventilated cap, support means for said tube and means comprising a flexible body holder attached to said tube having clips cooperating therewith and said holder supporting the animal with selected body portions exposed.

6. An animal restraining device comprising a tube, adapted to hold at least the head of the animal, light baffling ventilating means at one end thereof, support means for said tube, and means comprising a flexible body holder having clips attached thereto to support the animal with selected body portions exposed.

7. An animal holder including a rigid head-containing portion, support means attached thereto, light baffling ventilating means at one end thereof, and flexible body holder at the other end thereof, said body holder comprising a T-shaped member with fasteners attached to the ends of the bar thereof adapted to engage other fasteners on said holder portion whereby the rear portion of the animal may be rendered effectively immobile but such restraint being sufficiently gentle to avoid irritating the animal.

WILLIAM G. BROSENE, Jr.
FRANK B. ABLONDI.

REFERENCES CITED

The following references are of record in the file of this patent:

UNITED STATES PATENTS

| Number | Name | Date |
| --- | --- | --- |
| D. 110,625 | Nesbitt | July 26, 1938 |
| 168,683 | Tickner | Oct. 11, 1875 |
| 774,017 | Wulff | Nov. 1, 1904 |
| 1,200,969 | O'Shea | Oct. 10, 1916 |
| 1,550,547 | Jurey | Aug. 18, 1925 |
| 1,956,499 | Dworetzky | Apr. 24, 1934 |

FOREIGN PATENTS

| Number | Country | Date |
| --- | --- | --- |
| 355,088 | Great Britain | Aug. 20, 1931 |